(12) United States Patent
Mahaffy

(10) Patent No.: US 8,973,249 B2
(45) Date of Patent: Mar. 10, 2015

(54) TEST FIXTURES FOR AUTOMOTIVE PARTS AND METHODS OF FABRICATING THE SAME

(75) Inventor: Matthew James Mahaffy, Tipton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 774 days.

(21) Appl. No.: 13/206,093

(22) Filed: Aug. 9, 2011

(65) Prior Publication Data
US 2013/0037497 A1 Feb. 14, 2013

(51) Int. Cl.
*G01M 99/00* (2011.01)
*G01M 17/00* (2006.01)

(52) U.S. Cl.
CPC ............ *G01M 99/002* (2013.01); *G01M 99/00* (2013.01)
USPC ......... 29/593; 73/116.01; 324/378; 211/13.1; 29/428

(58) Field of Classification Search
CPC ......... G06F 19/00; G06F 17/00; G06F 9/455; G06F 17/50; G06F 17/5009; F16M 13/00; F16M 11/00; F16M 2200/028; B23P 17/04; B23P 11/00; B23P 15/00
USPC ............... 374/57; 700/98; 703/8, 7; 705/301; 211/13.1, 97–103; 29/76.2, 428, 432, 29/434, 445, 453, 457, 462, 493, 564.2, 29/565, 603.22, 889.7, 896.91, 897, 897.2, 29/897.31, 897.32, 898.053, DIG. 48, 592, 29/593, 889, 889.2, 33 R; 324/378; 73/116.01, 116.02–116.11
See application file for complete search history.

(56) References Cited

U.S. PATENT DOCUMENTS

| | | | |
|---|---|---|---|
| 5,640,667 A | 6/1997 | Freitag et al. | |
| 5,749,041 A * | 5/1998 | Lakshminarayan et al. | 419/2 |
| 5,775,402 A | 7/1998 | Sachs et al. | |
| 6,035,715 A | 3/2000 | Porter | |
| 6,446,697 B1 * | 9/2002 | Shaikh et al. | 164/4.1 |
| 6,702,918 B2 | 3/2004 | Yang et al. | |
| 6,975,971 B2 * | 12/2005 | Tang | 703/1 |
| 7,020,539 B1 | 3/2006 | Kovacevic et al. | |
| 7,403,830 B2 | 7/2008 | Weber et al. | |
| 7,545,158 B2 * | 6/2009 | Hopkins et al. | 324/757.04 |
| 7,607,225 B2 | 10/2009 | Huskamp et al. | |
| 8,209,044 B2 * | 6/2012 | Inoue | 700/98 |
| 8,412,367 B2 * | 4/2013 | Mahaffy | 700/98 |
| 8,585,666 B2 * | 11/2013 | Weisman et al. | 604/385.02 |
| 2004/0237439 A1 * | 12/2004 | Powell | 52/505 |
| 2006/0253215 A1 | 11/2006 | Weber et al. | |

(Continued)

*Primary Examiner* — Gail Kaplan Verbitsky
(74) *Attorney, Agent, or Firm* — Dinsmore & Shohl LLP

(57) ABSTRACT

Test fixtures for automotive parts, methods of fabricating test fixtures for automotive parts, and methods of heat testing automotive parts are disclosed. A method of fabricating a test fixture for supporting an automotive part may include forming a plurality of vertical support blades. Each of the plurality of vertical support blades comprises a support portion contoured to correspond to at least a portion of an underside of the automotive part. The method further includes assembling the plurality of vertical support blades such that each vertical support blade is substantially parallel to and spaced apart from an adjacent vertical support blade. The method further includes attaching the plurality of vertical support blades to a base such that the support portion of each of the plurality of vertical support blades is positioned to engage the corresponding portion of the underside of the automotive part.

20 Claims, 8 Drawing Sheets

(56) References Cited

U.S. PATENT DOCUMENTS

| | | |
|---|---|---|
| 2007/0016323 A1 | 1/2007 | Fried |
| 2009/0242721 A1 | 10/2009 | Carnevali |
| 2010/0042241 A1* | 2/2010 | Inoue .............................. 700/97 |
| 2011/0146375 A1* | 6/2011 | Schmaling et al. .......... 73/12.01 |
| 2013/0002367 A1* | 1/2013 | Tsironis ....................... 333/17.3 |

* cited by examiner

TEST FIXTURES FOR AUTOMOTIVE PARTS AND METHODS OF FABRICATING THE SAME

TECHNICAL FIELD

The present specification generally relates to test fixtures for automotive parts and methods of fabricating test fixtures for automotive parts and, more specifically, to test fixtures used to heat test automotive parts and methods of fabricating test fixtures used to heat test automotive parts.

BACKGROUND

In automotive manufacturing, automotive components, such as vehicle instrument panels, may be subjected to heat testing in order to evaluate the ability of the part to withstand heat for a prolonged period of time. A test fixture may be used to support the automotive component during the heat test. One way of fabricating a heat resistant test fixture is to cast a combination of resin and aluminum filler to the underside of a sacrificial part. The test fixture may then be bonded to a steel framework with resin. The sacrificial part may then be separated from the test fixture, leaving a test fixture shaped to support a part identical to the sacrificial part during a heat test. This method of fabricating test fixtures may result in the destruction of the sacrificial part. Moreover, because the test fixture is made from a sacrificial part, the fabrication of the test fixture cannot typically be started until production parts are available. Further, a test fixture fabricated by this method may be heavy because of the resin and aluminum filler. Finally, this method may require a significant amount of time and effort to fabricate.

Accordingly, a need exists for alternative test fixtures for automotive parts and methods for fabricating test fixtures for heat testing automotive parts.

SUMMARY

In one embodiment, a method of fabricating a test fixture for supporting an automotive part may include forming a plurality of vertical support blades. Each of the plurality of vertical support blades comprises a support portion contoured to correspond to at least a portion of an underside of the automotive part. The method further includes assembling the plurality of vertical support blades such that each vertical support blade is substantially parallel to and spaced apart from an adjacent vertical support blade. The method further includes attaching the plurality of vertical support blades to a base such that the support portion of each of the plurality of vertical support blades is positioned to engage the corresponding portion of the underside of the automotive part.

In another embodiment, a method of heat testing an automotive part includes fabricating a test fixture for supporting the automotive part. Fabricating the fixture includes forming a plurality of vertical support blades. Each of the plurality of vertical support blades comprises a support portion contoured to correspond to at least a portion of an underside of the automotive part. Fabricating the fixture further includes assembling the plurality of vertical support blades such that each vertical support blade is substantially parallel to and spaced apart from an adjacent vertical support blade. Fabricating the fixture further includes attaching the plurality of vertical support blades to a base such that the support portion of each of the plurality of vertical support blades is positioned to engage the corresponding portion of the underside of the automotive part. The method further includes positioning the fixture in a temperature controlled environment. The method further includes positioning the automotive part on the fixture such that the support portion of each vertical support blade engages with at least a portion of the underside of the automotive part. The method further includes exposing the fixture and the automotive part to a predetermined temperature for a predetermined period of time.

In yet another embodiment, a fixture for supporting an automotive part includes a plurality of vertical support blades. Each vertical support blade is substantially parallel to an adjacent vertical support blade. Each vertical support blade of the plurality of vertical support blades comprises a support portion contoured to correspond to at least a portion of an underside of the automotive part. The vertical support blades are separated from one another by a spacing S. The fixture further includes a base portion on which the plurality of vertical support blades are positioned.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 7:
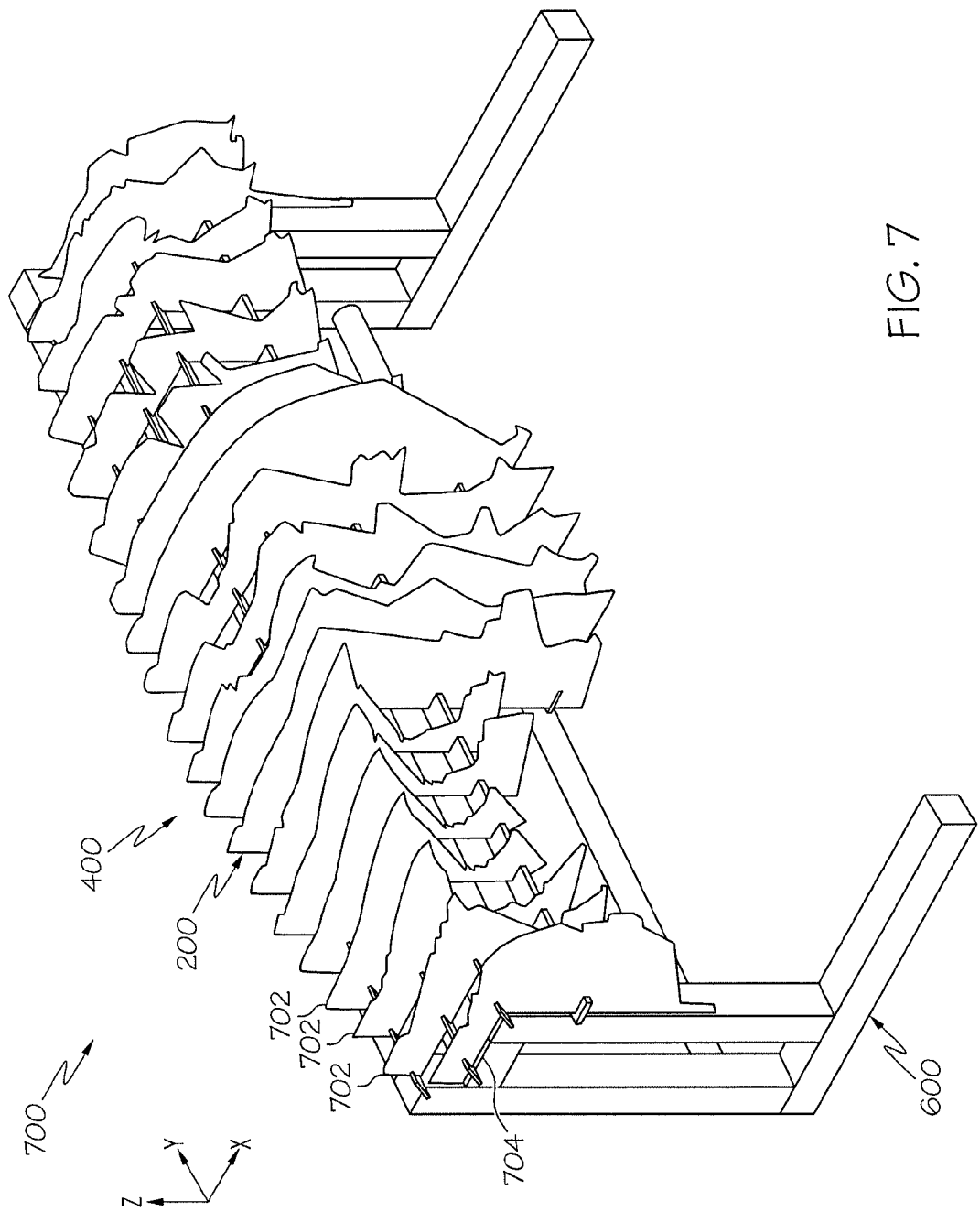
FIG. 7 schematically depicts a test fixture for supporting an automotive part, according to one or more embodiments shown and described herein.

FIG. 7 generally depicts a test fixture comprising vertical support blades and horizontal fixture blades supported by a base portion. Each vertical support blade is substantially parallel to adjacent vertical support blades. Each vertical support blade comprises a support portion which is contoured to correspond to at least a portion of an underside of an automotive part to be supported by the fixture. The vertical support blades are spaced apart from one another and attached to the base portion such that the support portion of each of the plurality of vertical support blades is oriented to engage with the corresponding portion of the underside of an automotive part. Various embodiments of test fixtures for automotive parts and methods of fabricating and using test fixtures for testing automotive parts will be described in more detail herein.

Coordinate axes are included in the drawings in order to provide a frame of reference for various components of the automotive part fixtures. As used herein, "vertical" is defined as a direction parallel to the z direction of the coordinate axes shown in the drawings. "Horizontal" is defined as a direction parallel to the y direction and/or the x-direction of the coordinate axes shown in the drawings. "Above" is defined as a position in the positive z direction of the coordinate axes shown in the drawings relative to a specified reference point. "Below" is defined as a position in the negative z direction of the coordinate axes shown in the drawings relative to a specified reference point. "Forward" is defined as a position in the positive x direction of the coordinate axes shown in the drawings relative to a specified reference point. "Rear" is defined as a position in the negative x direction of the coordinate axes shown in the drawings relative to a specified reference point.

Figure 1:
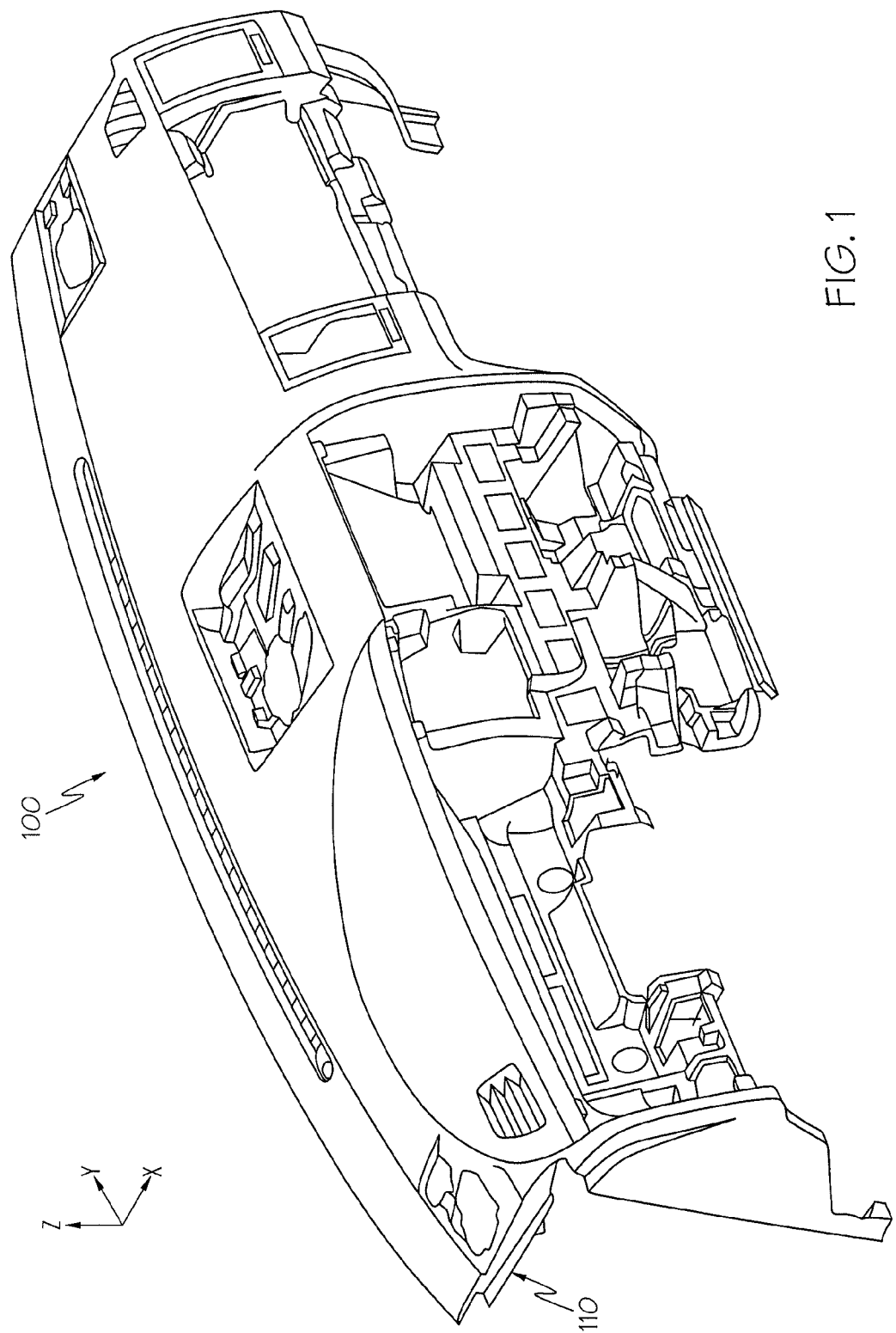
FIG. 1 schematically depicts an automotive part, specifically a vehicle instrument panel, according to one or more embodiments shown and described herein.

Referring now to FIG. 1, an automotive part, specifically a vehicle instrument panel 100, is schematically depicted. The vehicle instrument panel 100 comprises an underside 110. One embodiment of the present disclosure is directed to a test fixture for supporting the vehicle instrument panel 100 by engaging the underside 110 of the vehicle instrument panel 100 with a plurality of vertical support blades of an automotive part fixture. While specific embodiments described herein relate to test fixtures for supporting a vehicle instrument panel 100, it should be understood that the test fixtures described herein are also suitable for supporting other similar parts and components.

Figure 2:
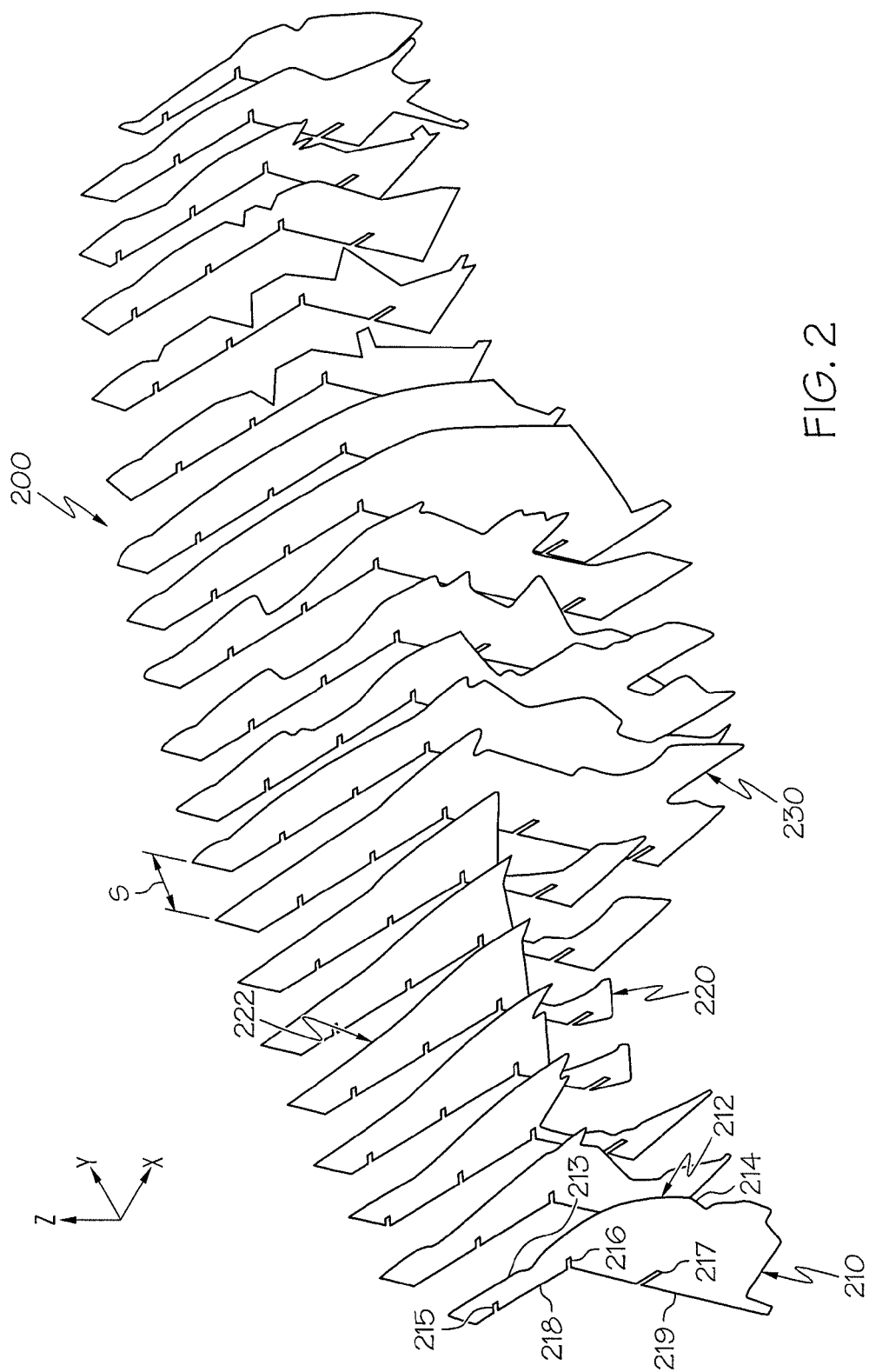
FIG. 2 schematically depicts a plurality of vertical support blades of a test fixture for supporting an automotive part, according to one or more embodiments shown and described herein.

Referring now to FIG. 2, a plurality of vertical support blades 200 of a test fixture for supporting an automotive part are schematically depicted. In some embodiments, the cross-sectional thickness of each vertical support blade may be in the range from about 3 mm to about 5 mm. However, it should be understood that vertical support blades of greater or lesser thickness may also be used. Referring to a first vertical support blade 210, in some embodiments the first vertical support blade 210 comprise a support portion 212, an underside 218, and a rear side 219. The underside 218 is substantially parallel to the x direction of the coordinate axis. The rear side 219 is substantially parallel to the z direction of the coordinate axis.

Still referring to FIG. 2, the support portion 212 is contoured to correspond to a portion of the underside of an automotive component, such as the underside 110 of the vehicle instrument panel 100. The support portion 212 of the first vertical support blade 210 generally comprises a substantially horizontal support portion 213 and a substantially vertical support portion 214. The substantially horizontal support portion 213 of the support portion 212 is contoured to correspond to a substantially horizontal portion of the underside 110 of the vehicle instrument panel 100 when the vehicle instrument panel 100 is supported by the fixture blade assembly. The substantially vertical support portion 214 of the support portion 212 of the first vertical support blade 210 is contoured to correspond to a substantially vertical portion of the underside 110 of the vehicle instrument panel 100 when the vehicle instrument panel 100 is supported by the fixture blade assembly.

While the support portion 212 of the first vertical support blade 210 is described as comprising a substantially horizontal support portion 213 and a substantially vertical support portion 214, the contour and orientation of the support portions of other vertical support blades may vary. For example, the support portion 222 of a second vertical support blade 220 is formed without a substantially vertical support portion.

Still referring to FIG. 2, in some embodiments, each of the vertical support blades comprises mounting notches. For example, the first vertical support blade 210 comprises mounting notches 215, 216, and 217. The mounting notches 215, 216, and 217 facilitate connecting the first vertical support blade 210 to a plurality of horizontal fixture blades. Specifically, the plurality of horizontal fixture blades may be received in the mounting notches 215, 216, and 217, thereby fixing the position of the first vertical support blade 210. In this embodiment, it should be understood that each of the vertical support blades generally comprises mounting notches for receiving the plurality of horizontal fixture blades, such that the position of the vertical support blades is fixed.

While the vertical support blades comprise mounting notches in some embodiments, in other embodiments the vertical support blades are formed without mounting notches, such as when the vertical support blades are mounted directly to a base portion or when the vertical support blades are connected to a plurality of horizontal fixture blades that comprise mounting notches for receiving the vertical support blades.

Still referring to FIG. 2, each vertical support blade of the plurality of vertical support blades 200 is substantially parallel to adjacent vertical support blades. For example, the first vertical support blade 210 is substantially parallel to the second vertical support blade 220 and the third vertical support blade 230. Each vertical support blade of the plurality of vertical support blades 200 is separated from directly adjacent vertical support blades by a spacing S. In some embodiments, the spacing S may be in the range from about 50 mm to about 100 mm. However, it should be understood that larger or smaller spacing may be used. Further, while the spacing S is depicted in FIG. 2 as uniform between all of the vertical support blades, in some other embodiments, the spacing between adjacent pairs of vertical support blades may vary from the spacing between another adjacent pair of vertical support blades.

Figure 3:
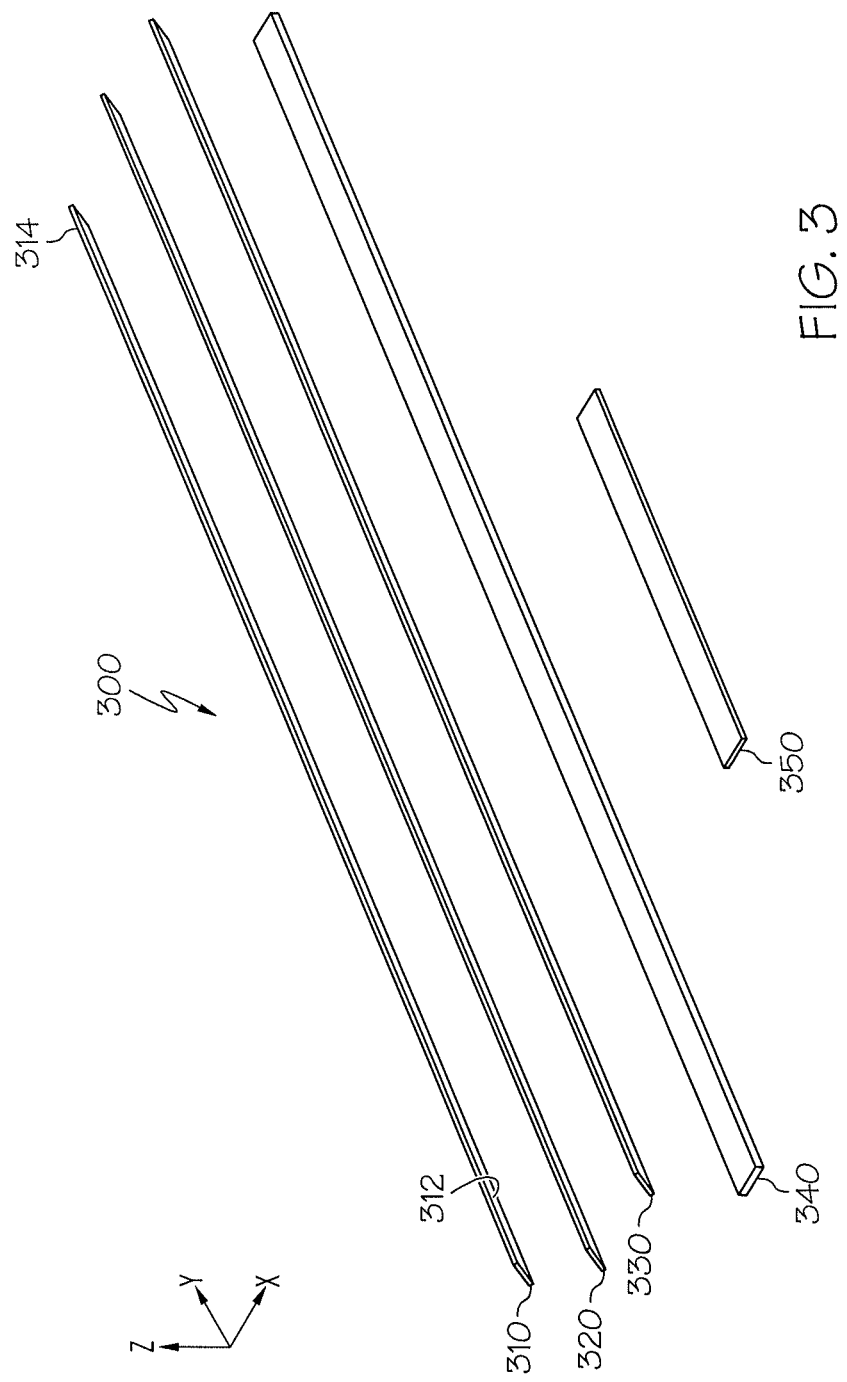
FIG. 3 schematically depicts a plurality of horizontal fixture blades of a test fixture for supporting an automotive part, according to one or more embodiments shown and described herein.

Referring now to FIG. 3, a plurality of horizontal fixture blades 300 for supporting the plurality of vertical support blades are schematically depicted. In the embodiments described herein, the plurality of horizontal fixture blades 300 comprise a first horizontal fixture blade 310, a second horizontal fixture blade 320, a third horizontal fixture blade 330, a fourth horizontal fixture blade 340, and a fifth horizontal fixture blade 350. However, it should be understood that in other embodiments fewer than five horizontal fixture blades or more than five horizontal fixture blades may be used. Still referring to FIG. 3, the plurality of horizontal fixture blades 300 are oriented to extend substantially in the horizontal direction. For example, the first horizontal fixture blade 310 comprises a first end 312 and a second end 314. The first horizontal fixture blade 310 is oriented such that the second end 314 of the first horizontal fixture blade 310 extends in the positive y direction of the coordinate axes, relative to the first end 312 of the first horizontal fixture blade 310. The fourth horizontal fixture blade 340 and the fifth horizontal fixture blade 350 are oriented substantially parallel to the x direction of the coordinate axes. The first horizontal fixture blade 310, the second horizontal fixture blade 320, and the third horizontal fixture blade 330 are oriented at approximately a 45° angle relative to the x direction of the coordinate axes. However, it should be understood that the orientation of the plurality of horizontal fixture blades 300 relative to the x direction of the coordinate axes may vary.

In one embodiment, the plurality of vertical support blades and the plurality of horizontal fixture blades may be formed based on three-dimensional automotive part data received by a computer. The three-dimensional automotive part data may be in a file format that can be opened using a computer aided drafting ("CAD") program, such as CATIA, ProE, or Magix, among others. The three-dimensional automotive part data represents an automotive part for which a test fixture is to be designed and fabricated to support the automotive part during testing. The three-dimensional automotive part data includes data that represents at least an underside of the automotive part.

The computer system may be utilized to manipulate the received three-dimensional automotive part data to determine the shape of the automotive part, and display a graphical representation of the automotive part on a computer screen. The CAD program may be utilized to generate a scaled automotive part, as is generally known in the art. For example, a scaled automotive part with dimensions approximately 3% larger than the dimensions of the automotive part may be generated.

The CAD program may also be utilized to generate a negative of the underside of the automotive part, which generally corresponds to the contours of the underside of the automotive part. The CAD program may be further utilized to design a plurality of vertical support blades by removing vertical slices of the negative of the underside of the automotive part, thereby leaving a plurality of vertical support blades, each of which comprises a support portion contoured to correspond to a different portion of the underside of the automotive part, as described above. If a scaled automotive part was used to generate the negative of the underside of the automotive part, the dimensions of the support portions of the plurality of support blades may be smaller than the dimensions of the corresponding portions of the underside of the automotive part, thereby facilitating easier release of the automotive part supported by the test fixture formed from the plurality of vertical support blades. In one embodiment, a plurality of vertical support blades of a specified thickness may be designed by removing vertical slices of the underside of the automotive part that are of a certain width at intervals that correspond to the desired thickness of the vertical support blades. The CAD program may be utilized to alter the thickness of any blade of the plurality of vertical support blades based on the corresponding portion of the underside of the automotive part that the particular vertical support blade is designed to support. For example, a vertical support blade designed to support a portion of the underside of the automotive part that bears a relatively large amount of the weight of the automotive part may be thicker than the other vertical support blades.

In one embodiment, the negative of the underside of the automotive part may be manipulated such that the spacing between each of the plurality of vertical support blades is in the range from about 50 mm to about 200 mm. In another embodiment, the spacing between each of the plurality of vertical support blades may be in the range from about 50 mm to about 75 mm. In some embodiments, the spacing between each of the plurality of vertical support blades may be uniform, while in other embodiments the spacing may vary. The spacing between each of the plurality of vertical support blades may depend on the shape of the automotive part. The CAD program may be utilized to alter the spacing between any adjacent pair of vertical support blades based on the corresponding portion of the underside of the automotive part that the particular vertical support blade is designed to support. The plurality of vertical support blades may be designed so that each vertical support blade has an underside that is substantially straight and a rear side that is substantially straight and substantially perpendicular to the underside.

The CAD program is also utilized to position the mounting notches in each of the plurality of designed vertical support blades. The layout and spacing of the mounting notches allows each of the plurality of vertical support blades to be mounted to the plurality of horizontal support blades. The space between the mounting notches may depend on the rigidity of the automotive part and the desired spacing of the vertical support blades.

The CAD program may also be utilized to generate the plurality of horizontal fixture blades that engage the mounting notches of the vertical support blades. The length of each horizontal fixture blade depends on the number of vertical support blades that are mounted to the horizontal fixture blade and the spacing between the vertical support blades that are mounted to the horizontal fixture blade. In some embodiments, the thickness of the plurality of horizontal fixture blades is substantially the same as the thickness of the plurality of vertical support blades. However, in other embodiments, the thickness of the plurality of horizontal fixture blades varies. The thickness of the plurality of horizontal fixture blades is based on the automotive part data.

While the generation of the plurality of vertical support blades and the plurality of horizontal fixture blades has been described with reference to a user of a computer system designing the plurality of vertical support blades and the plurality of horizontal fixture blades, it should be understood that data representing the layout, shape, and dimensions of the plurality of vertical support blades and the plurality of horizontal fixture blades may be automatically generated by a computer based on the three-dimensional automotive part data.

After the plurality of vertical support blades are designed, computer data representing the plurality of vertical support blades may be provided to a selective laser sintering machine ("SLS machine") that fabricates the plurality of vertical support blades from a feed material. The SLS machine may form the plurality of vertical support blades from any one of a variety of feed materials, including without limitation, nylon 12, glass-filled nylon, carbon fiber infused nylon, PEEK (polyetheretherketone), or any other material suitable for an SLS machine. The SLS machine may be a machine manufactured by 3D Systems, EOS, or any other manufacturer of an SLS machine.

Computer data representing the plurality of horizontal fixture blades may also be provided to a selective laser sintering machine ("SLS machine") that fabricates the plurality of horizontal fixture blades. The SLS machine may form the plurality of horizontal fixture blades from any one of a variety of feed materials, including without limitation, nylon 12, glass-filled nylon, carbon fiber infused nylon, PEEK (polyetheretherketone), or any other material suitable for an SLS machine.

While an SLS machine may be used to fabricate the plurality of vertical support blades and/or the plurality of horizontal fixture blades, it should be understood that any other automated fabrication technique that utilizes computer data representing the plurality of vertical support blades and/or the plurality of horizontal fixture blades may be employed to fabricate the blades. By way of example, the blades may be fabricated by cutting the plurality of vertical support blades and/or the plurality of horizontal fixture blades from a sheet of material using a laser, a water jet, a plasma jet, and/or CNC machining.

Once the plurality of vertical support blades and the plurality of horizontal fixture blades have been formed by the SLS machine, the plurality of vertical support blades may be assembled by sliding each horizontal fixture blade into the corresponding notch of each of the plurality of vertical support blades that will engage the horizontal fixture blade so that the plurality of vertical fixture blades are properly spaced apart to support the underside of the automotive part. While the vertical support blades may be assembled to the horizontal fixture blades by mechanical engagement alone, high temperature glue, epoxy, or any other adhesive may be applied to interlock the plurality of vertical support blades with the plurality of horizontal fixture blades. Each of the plurality of vertical support blades may be numbered in order to facilitate quick assembly of the plurality of vertical support blades to the plurality of horizontal fixture blades.

Figure 4:
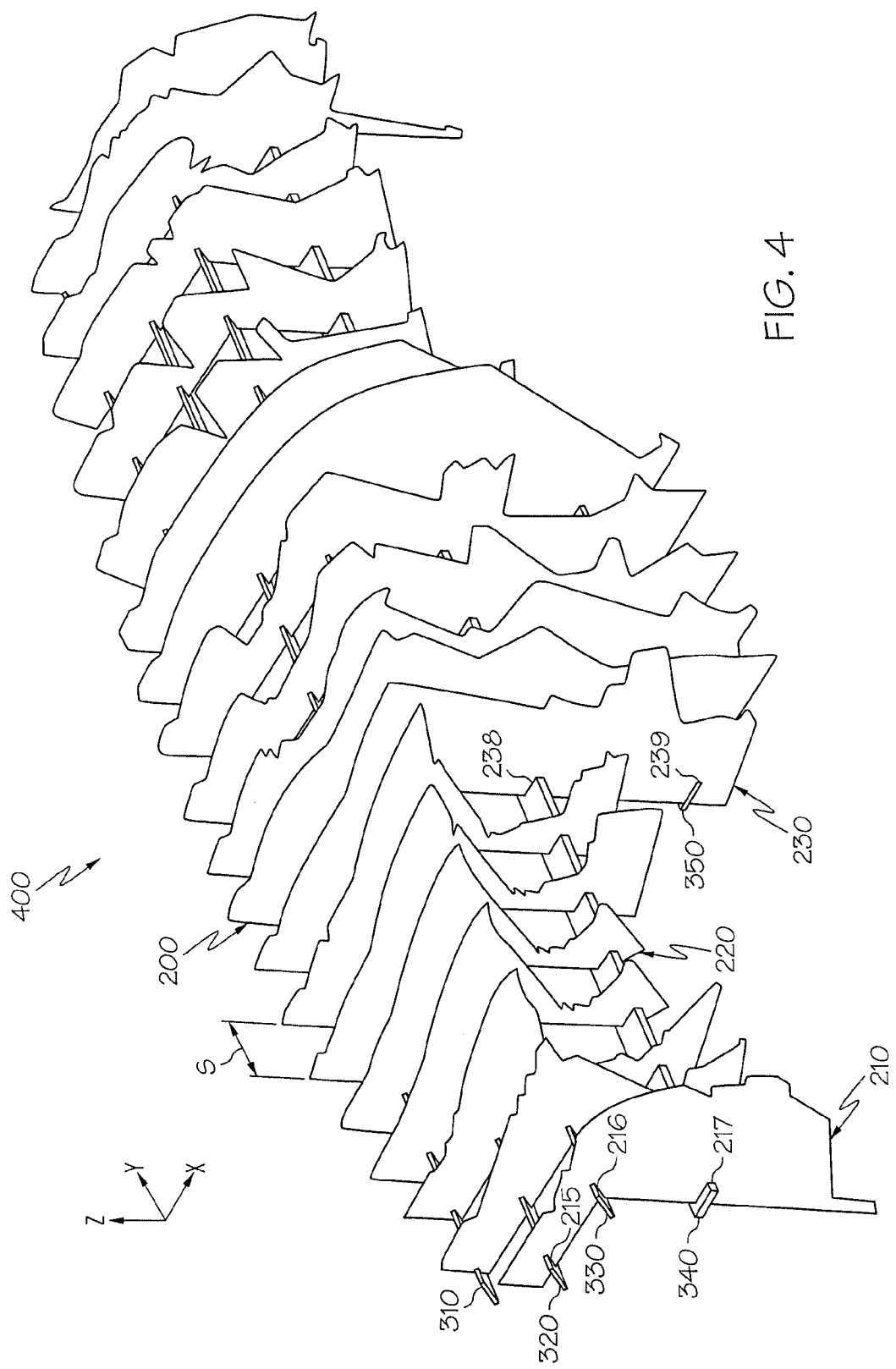
FIG. 4 schematically depicts an assembly of vertical support blades and horizontal fixture blades, according to one or more embodiments shown and described herein.

Referring now to FIG. 4, an assembly 400 of the plurality of vertical support blades 200 and the plurality of horizontal fixture blades 300 is schematically depicted. As shown in FIG. 4, the plurality of vertical support blades 200 are mounted on the plurality of horizontal fixture blades 300 such that there is a spacing S between each pair of vertical support blades. The plurality of horizontal fixture blades 300 are engaged in the mounting notches of the plurality of vertical support blades 200. For example, the first vertical support blade 210 is connected to the second horizontal fixture blade 320, the third horizontal fixture blade 330, and the fourth horizontal fixture blade 340. Specifically, the second horizontal fixture blade 320 engages the mounting notch 215 of the first vertical support blade 210, the third horizontal fixture blade 330 engages the mounting notch 216 of the first vertical support blade 210, and the fourth horizontal fixture blade 340 engages the mounting notch 217 of the first vertical support blade 210.

The remainder of the plurality of vertical support blades 200 are mounted to the plurality of horizontal fixture blades 300 such that the mounting notches of each vertical support blade engage the corresponding horizontal fixture blades, as shown in FIG. 4.

While the embodiments shown and described herein comprise a plurality of horizontal fixture blades for mounting the plurality of vertical support blades to facilitate properly spacing the plurality of vertical support blades, it should be understood that the test fixture may be formed without horizontal fixture blades. For example, in some embodiments (not shown), the plurality of vertical support blades may be directly mounted to a base portion of the test fixture.

Further, in some other embodiments, the horizontal fixture blades may be formed with a plurality of mounting notches for receiving the vertical support blades that are formed without mounting notches.

Figure 5:
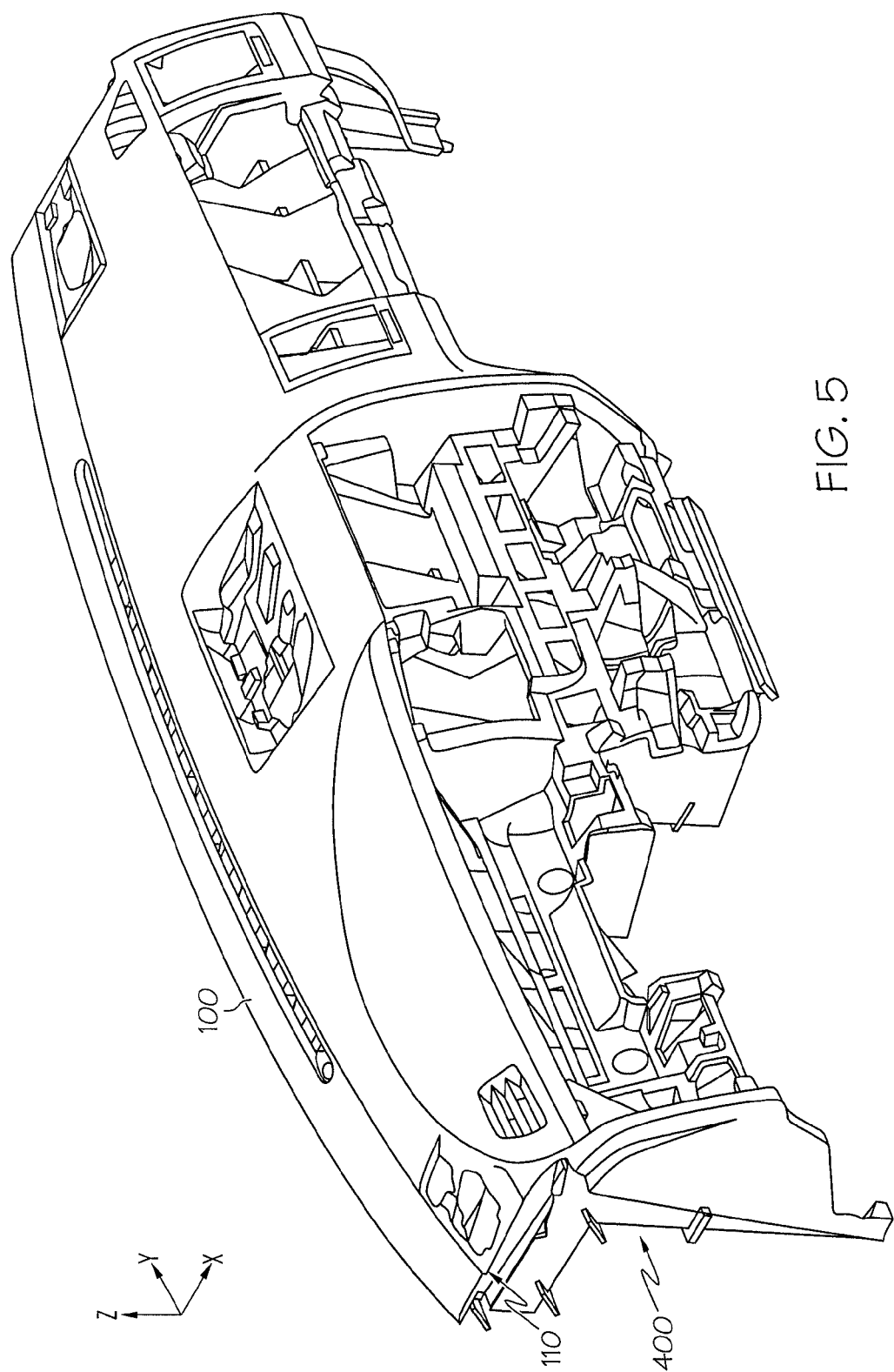
FIG. 5 schematically depicts an automotive part supported by an assembly of vertical support blades and horizontal fixture blades, according to one or more of the embodiments shown and described herein.

Referring now to FIG. 5, a vehicle instrument panel 100 supported by an assembly 400 of the plurality of vertical support blades 200 and the plurality of horizontal fixture blades 300 is schematically depicted. The vehicle instrument panel 100 is supported by the assembly 400 such that the support portion of each of the plurality of vertical support blades 200 engages the corresponding portion of the underside 110 of the vehicle instrument panel 100.

In some embodiments, a base portion is fabricated to support the assembly of the vertical support blades and horizontal fixture blades. The base portion may be fabricated using square steel tube so that the fixture assembly may rest on the base portion and be supported off of the ground, as will be understood by a person of ordinary skill in the art. Once the base portion has been fabricated, the fixture assembly may be supported by the base portion by resting the fixture assembly on top of the base portion or affixing the fixture assembly to the base portion using any type of adhesive or mechanical fastener.

Figure 6:
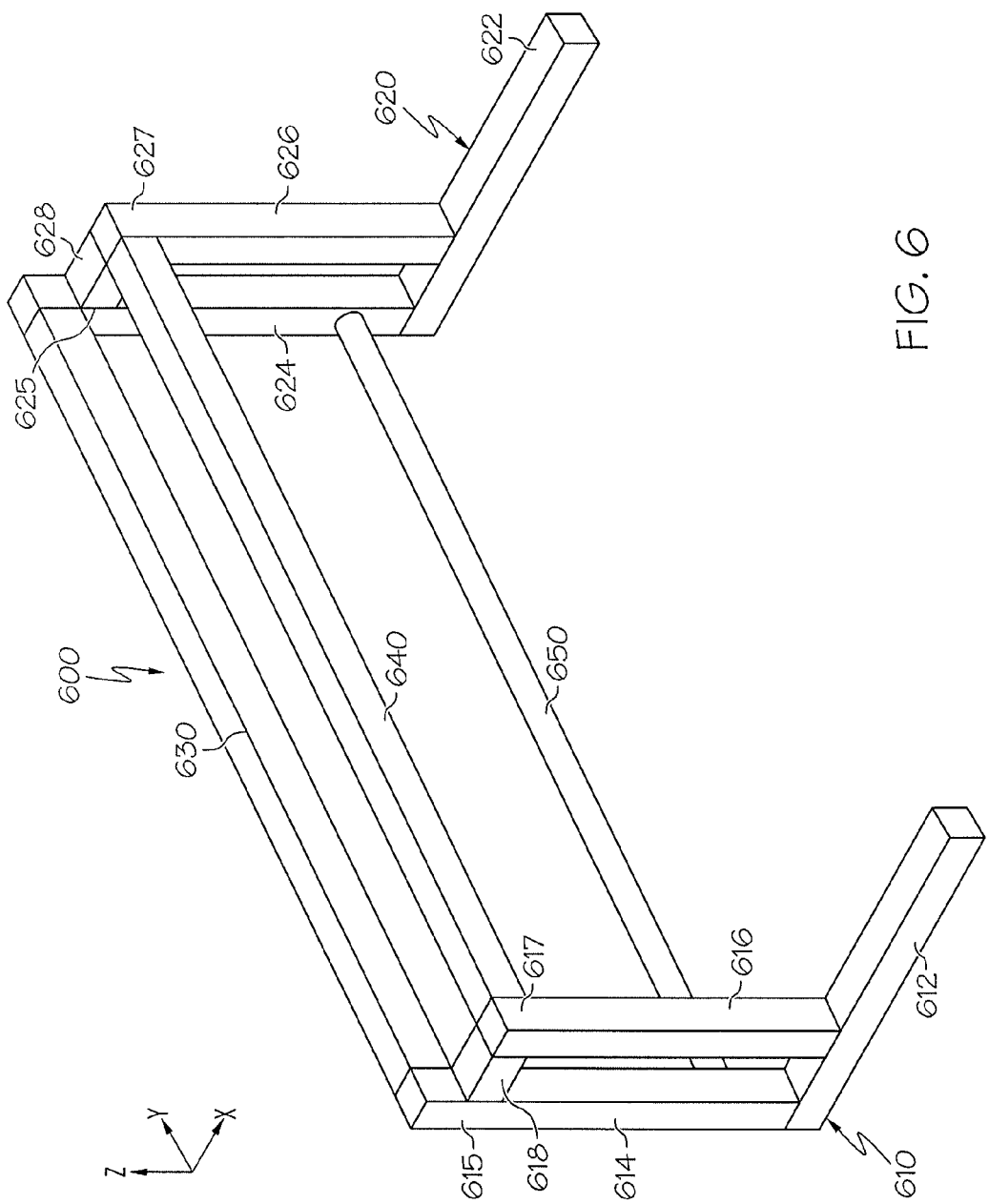
FIG. 6 schematically depicts a base portion of a test fixture for supporting an automotive part, according to one or more embodiments shown and described herein.

Referring now to FIG. 6, one embodiment of a base portion 600 of the test fixture is schematically depicted. The base portion 600 comprises a first leg 610, a second leg 620, a first cross member 630, a second cross member 640, and a third cross member 650. The first leg 610 comprises a support portion 612, a first vertical portion 614, a second vertical portion 616, and a connecting portion 618. The first vertical portion 614 extends vertically from the support portion 612. The second vertical portion 616 extends vertically from the support portion 612. The second vertical portion 616 engages the support portion 612 forward of where the first vertical portion 614 engages the support portion 612. The connecting portion 618 extends from the top 617 of the second vertical portion 616 to an upper part 615 of the first vertical portion 614.

Still referring to FIG. 6, the second leg 620 comprises a support portion 622, a first vertical portion 624, a second vertical portion 626, and a connecting portion 628. The first vertical portion 624 extends vertically from the support portion 622. The second vertical portion 626 extends vertically from the support portion 622. The second vertical portion 626 engages the support portion 622 forward of where the first vertical portion 624 engages the support portion 622. The connecting portion 628 extends from the top 627 of the second vertical portion 626 to an upper part 625 of the first vertical portion 624.

Still referring to FIG. 6, the first cross member 630 extends from the top of the first vertical portion 614 of the first leg 610 to the top of the first vertical portion 624 of the second leg 620. The second cross member 640 extends from the top 617 of the second vertical portion 616 of the first leg 610 to the top 627 of the second vertical portion 626 of the second leg 620. The third cross member 650 extends from a lower portion of the first vertical portion 614 of the first leg 610 to a lower portion of the first vertical portion 624 of the second leg 620.

Still referring to FIG. 6, the various components of the base portion 600 may be connected by welding the pieces together, mechanically fastening the pieces together, or connecting the pieces together using an adhesive. While the embodiment of the base portion 600 schematically depicted in FIG. 6 comprises three cross members, it should be understood that, in other embodiments, fewer than three cross members or more than three cross members may be used. Further, the orientation of the cross members schematically depicted in FIG. 6 may vary depending on the particular configuration of the assembly 400 of the plurality of vertical support blades 200 and the plurality of horizontal fixture blades 300.

Referring now to FIGS. 4, 6, and 7, a test fixture 700 for positioning an automotive part is schematically depicted. The test fixture 700 comprises the assembly 400 of the plurality of vertical support blades 200 and the plurality of horizontal fixture blades 300 supported by the base portion 600 of FIG. 6. As depicted in FIG. 7, a rear side 702 of the plurality of vertical support blades 200 abuts the first cross member 630 (FIG. 6) of the base portion 600. An underside 704 of the plurality of vertical support blades 200 abuts the second cross member 640 (FIG. 6) of the base portion 600.

While the plurality of vertical fixture blades may be mounted on a plurality of horizontal fixture blades in one embodiment of the present disclosure, the plurality of vertical support blades may be directly mounted on any suitable base portion, as long as the mounted vertical support blades are spaced apart such that the support portion of each of the plurality of vertical support blades engages the corresponding portion of the underside of the automotive part.

Figure 8:
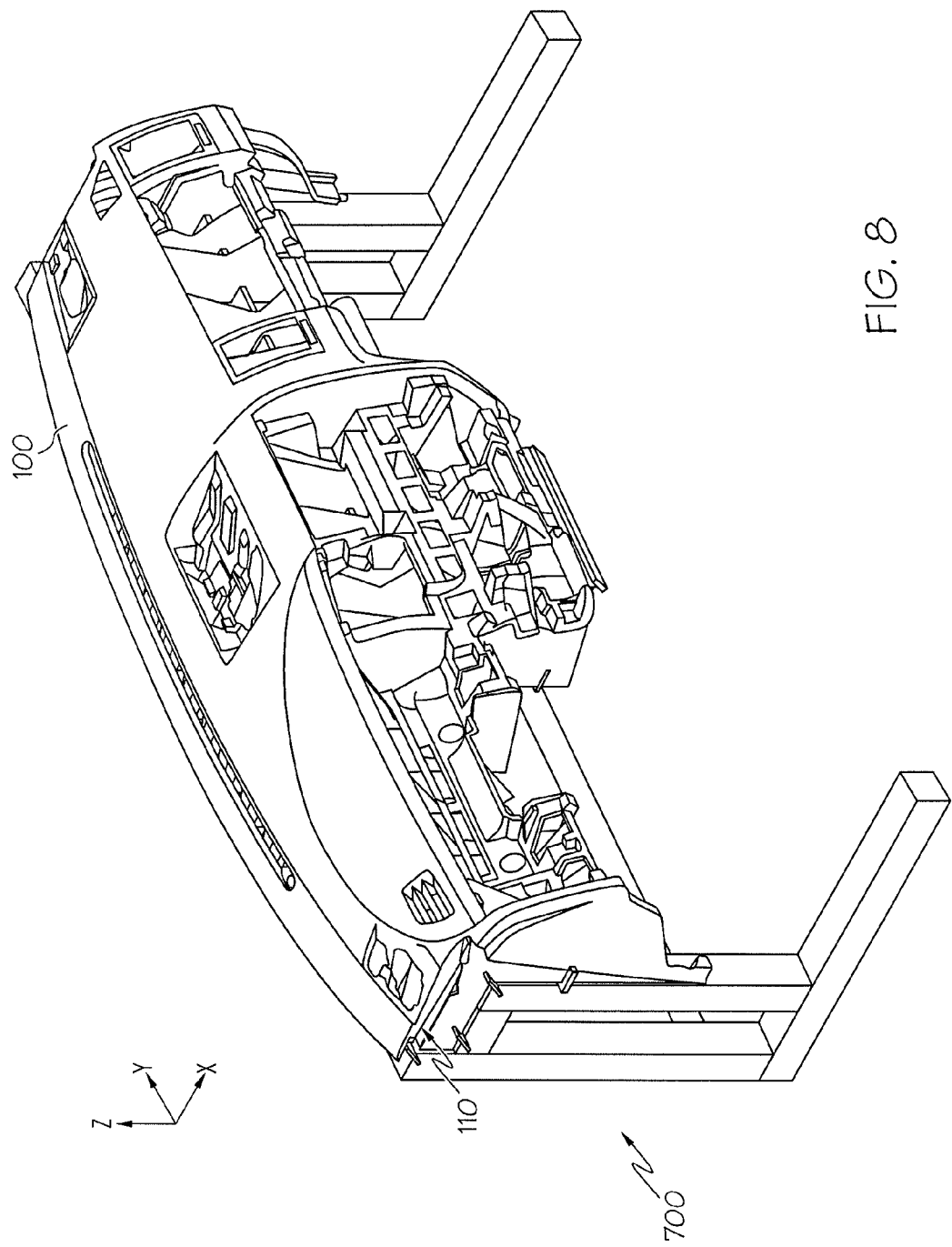
FIG. 8 schematically depicts an automotive part supported by a test fixture comprising vertical support blades and horizontal fixture blades attached to a base portion, according to one or more embodiments shown and described herein.

Referring now to FIG. 8, a vehicle instrument panel 100 is schematically depicted as being supported by the test fixture 700 of FIG. 7. The vehicle instrument panel 100 is supported by the test fixture 700, such that the support portion of each of the plurality of vertical support blades 200 engages the corresponding portion of the underside 110 of the vehicle instrument panel 100.

In one embodiment, once a test fixture has been fabricated according to the present disclosure, the test fixture may be positioned in a temperature controlled environment to facilitate heat testing an automotive part. The temperature controlled environment may be a chamber or room used for heat testing the part. The automotive part may be positioned on the test fixture such that the support portion of each of the plurality of vertical support blades engages at least a portion of the underside of the automotive part. The assembly of the automotive part and test fixture may then be exposed to a predetermined temperature for a predetermined time. For example, in one embodiment, the automotive part and test fixture may be exposed to a temperature in excess of 150° C. for at least 60 days.

It should now be understood that the method of fabricating a test fixture for an automotive part described herein may provide for quickly fabricating the test fixture from automotive part data before a production automotive part is available. Further, the method of fabricating a test fixture for an automotive part described herein may permit the test fixture to be fabricated without destroying an automotive part that may have been used in the fabrication of the test fixture. Moreover, a test fixture as described herein may be lightweight because the test fixture comprises a plurality of vertical support blades instead of a unitary solid piece.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of fabricating a test fixture for supporting an automotive part, the method comprising:
    forming a plurality of vertical support blades, wherein each of the plurality of vertical support blades comprises a support portion contoured to correspond to at least a portion of an underside of the automotive part;
    assembling the plurality of vertical support blades such that each vertical support blade is substantially parallel to and spaced apart from an adjacent vertical support blade; and
    attaching the plurality of vertical support blades to a base such that the support portion of each of the plurality of vertical support blades is positioned to engage the corresponding portion of the underside of the automotive part.

2. The method of claim 1, wherein forming the plurality of vertical support blades comprises fabricating the vertical support blades using a selective laser sintering machine.

3. The method of claim 2, wherein the plurality of vertical support blades are formed from a material selected from the group consisting of: nylon 12, glass-filled nylon, carbon fiber infused nylon, and polyetheretherketone.

4. The method of claim 1 further comprising the preliminary steps of:
    receiving, with a computer, three-dimensional automotive part data representing at least the underside of the automotive part; and
    determining, with the computer, a shape of at least the support portion of each of the plurality of vertical support blades based on the three-dimensional automotive part data such that the support portion of each of the plurality of vertical support blades is contoured to correspond to at least a portion of the underside of the automotive part.

5. The method of claim 4, wherein forming the plurality of vertical support blades comprises fabricating the vertical support blades using a selective laser sintering machine based on the three-dimensional automotive part data.

6. The method of claim 4, wherein a spacing between adjacent vertical support blades is based on the three-dimensional automotive part data.

7. The method of claim 4 further comprising:
    scaling the three-dimensional automotive part data such that the dimensions of the support portions of the plurality of vertical support blades are smaller than the dimensions of at least a portion of the underside of the automotive part to facilitate releasing the automotive part from the test fixture.

8. The method of claim 1 further comprising:
    forming the plurality of vertical support blades such that each vertical support blade of the plurality of vertical support blades has at least one mounting notch;
    forming at least one horizontal fixture blade, wherein the at least one horizontal fixture blade engages the mounting notch of each vertical support blade; and
    mounting the plurality of vertical support blades on the at least one horizontal fixture blade.

9. The method of claim 8, wherein forming the at least one horizontal fixture blade comprises fabricating the at least one horizontal fixture blade using a selective laser sintering machine.

10. The method of claim 8, wherein the plurality of vertical support blades are mounted on the at least one horizontal fixture blade such that the plurality of vertical support blades are substantially perpendicular to the at least one horizontal fixture blade.

11. A method of heat testing an automotive part, the method comprising:
    fabricating a test fixture for supporting the automotive part, wherein fabricating the test fixture comprises:
        forming a plurality of vertical support blades, wherein each of the plurality of vertical support blades comprises a support portion contoured to correspond to at least a portion of an underside of the automotive part;
        assembling the plurality of vertical support blades such that each vertical support blade is substantially parallel to and spaced apart from an adjacent vertical support blade;

attaching the plurality of vertical support blades to a base such that the support portion of each of the plurality of vertical support blades is positioned to engage the corresponding portion of the underside of the automotive part;

positioning the test fixture in a temperature controlled environment;

positioning the automotive part on the test fixture such that the support portion of each vertical support blade engages with at least a portion of the underside of the automotive part; and exposing the test fixture and the automotive part to a predetermined temperature for a predetermined period of time.

12. The method of claim 11, wherein forming the plurality of vertical support blades comprises fabricating the vertical support blades using a selective laser sintering machine.

13. The method of claim 11 further comprising the preliminary steps of:

receiving, with a computer, three-dimensional automotive part data representing at least the underside of the automotive part; and determining, with the computer, a shape of at least the support portion of each of the plurality of vertical support blades based on the three-dimensional automotive part data such that the support portion of each of the plurality of vertical support blades is contoured to correspond to at least a portion of the underside of the automotive part.

14. The method of claim 13, wherein forming the plurality of vertical support blades comprises fabricating the vertical support blades using a selective laser sintering machine based on the three-dimensional automotive part data.

15. The method of claim 13, wherein a spacing S between adjacent vertical support blades is based on the three-dimensional automotive part data.

16. The method of claim 11 further comprising:

forming the plurality of vertical support blades such that each vertical support blade of the plurality of vertical support blades has at least one mounting notch;

forming at least one horizontal fixture blade, wherein the at least one horizontal fixture blade engages the mounting notch of each vertical support blade; and mounting the plurality of vertical support blades on the at least one horizontal fixture blade.

17. A test fixture for supporting an automotive part, the test fixture comprising:

a horizontal fixture blade;

a plurality of vertical support blades, wherein:

each vertical support blade is substantially parallel to an adjacent vertical support blade;

each vertical support blade of the plurality of vertical support blades comprises a support portion contoured to correspond to at least a portion of an underside of the automotive part;

the vertical support blades are separated from one another by a spacing S;

at least one of the plurality of vertical support blades includes a mounting notch; and the horizontal fixture blade engages the mounting notch; and a base portion on which the plurality of vertical support blades are positioned.

18. The test fixture of claim 17, wherein 50 mm≤S≤100 mm.

19. The test fixture of claim 17, wherein a thickness of each vertical support blade is in the range of about 3 mm to about 5 mm.

20. The test fixture of claim 17, wherein the spacing S and a thickness of each vertical support blade are based on three-dimensional automotive part data corresponding to the automotive part.

* * * * *